(12) United States Patent
Born et al.

(10) Patent No.: US 6,404,887 B1
(45) Date of Patent: Jun. 11, 2002

(54) INTRA-CALL CONTROL OF ANCILLARY TELECOMMUNICATIONS EQUIPMENT

(75) Inventors: Robert Born, Plano; Clint Wagner, Allen, both of TX (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/104,140

(22) Filed: Jun. 24, 1998

(51) Int. Cl.$^7$ .................................................. H04M 9/08
(52) U.S. Cl. ............................ 379/406.04; 379/406.01; 379/399.1; 370/286; 370/523
(58) Field of Search .................................. 379/406, 408, 379/409, 410, 406.01, 406.04, 406.05, 399.01, 3; 370/286, 287, 289, 522, 523, 524

(56) References Cited

U.S. PATENT DOCUMENTS

| | | | | |
|---|---|---|---|---|
| 5,014,306 A | * | 5/1991 | Rodgers et al. | 379/407 |
| 5,408,524 A | * | 4/1995 | Reum | 379/157 |
| 5,530,724 A | * | 6/1996 | Abrams et al. | 375/345 |
| 5,533,121 A | * | 7/1996 | Suzuki et al. | 379/410 |
| 6,055,311 A | * | 4/2000 | Dreyfert et al. | 379/410 |
| 6,104,730 A | * | 8/2000 | Marks | 370/523 |
| 6,111,861 A | * | 8/2000 | Burgess | 370/286 |
| 6,134,224 A | * | 10/2000 | Reese et al. | 370/286 |

OTHER PUBLICATIONS

"Robbed–bit signaling definitions for channelized DS1 Interfaces" from the American Standards Institute (ANSI), (ANSI Standard T1.403–1995) Jan. 21, 1997 at 11:09:24 am.

"Figures 5–10" from a standards document issued by the American Standards Institute (ANSI), (ANSI Standard T1–107 1995), Jan. 22, 1997 at 11:08:05 am, pp.27–32.

"Digital Exchange Connections, Signalling and Ancillary Functions" from the International Telecommunications Union/ITU Telecommunications Standardization, Aug. 27, 1997, at 12:01:35 pm. pp. 24–39.

"Section 3—Control of Echo Suppressors" from the International Telecommunications Union/ITU Telecommunications Standardization, Aug. 27, 1997 at 12:06:41 pm. pp. 481–487.

* cited by examiner

*Primary Examiner*—Fan Tsang
*Assistant Examiner*—Ovidio Escalante (57) ABSTRACT

System and method for controlling a telecommunications device such as an echo canceller within a telecommunications system. The system and method include and involve a switching system that is configured to receive a call from a calling station and to route said call within said telecommunications system, and an ancillary telecommunications device that is configured to control a call processing parameter to affect said call. The switching system and the ancillary telecommunications device are coupled to each other via a channelized call data network. The channelized call data network is configured to communicate data corresponding to the call over at least one data channel. The ancillary telecommunications device may control the call processing parameter to affect the call based on a directive issued by the switching system to the ancillary telecommunications device during the call. The directive is contained within at least one channel of the channelized call data network. Additionally, the channelized call data network may be completely used for call processing and call payload transport even after the ancillary telecommunications device operates as directed (e.g., activates, deactivates, etc.) during the call.

39 Claims, 10 Drawing Sheets

FIG. 1

| Frame Number | Information Coding Bits | Signaling Bit | SF Signaling Options | | |
|---|---|---|---|---|---|
| | | | T | 2 State | 4 State |
| 1 | 1-6 | | | | |
| 2 | 1-6 | | | | |
| 3 | 1-6 | | | | |
| 4 | 1-6 | | | | |
| 5 | 1-6 | | | | |
| 6 | 1-7 | 8 | - | A | A |
| 7 | 1-6 | | | | |
| 8 | 1-6 | | | | |
| 9 | 1-6 | | | | |
| 10 | 1-6 | | | | |
| 11 | 1-6 | | | | |
| 12 | 1-7 | 8 | - | A | B |

Option T: Transport (Signaling bit 8 used for information coding).
Option 2 State: Two state option provides one 1333 bit/s signaling channel designated A and B.
Option 4 State: Four state option provides two independent 667 bit/s signaling channels designated A and B.

FIG. 8

INTRA-CALL CONTROL OF ANCILLARY TELECOMMUNICATIONS EQUIPMENT

BACKGROUND OF THE INVENTION

1. Field of the Invention

The present invention relates to systems and methods that are used to control ancillary telecommunications equipment to facilitate proper call routing and processing in a telecommunications network.

2. Description of the Related Art

In modern call processing networks such as those incorporating digital call transport systems, ancillary telecommunications devices such as echo suppressors and cancellers are used to process and service calls. Typically, the use of such ancillary telecommunications devices is triggered by the nature and type of call to be serviced. For example, voice calls, in contrast to data calls, often require echo control within a call path to negate the effects of echo and the like. To invoke an ancillary device such as an echo canceller to service a call, the same must be activated/deactivated in response to a control signal sent from an instructing switching system such as during an initial request for service or other call setup sequence. Typically, switching systems such as inter-exchange switching systems, control ancillary telecommunications devices through use of well known signaling techniques which are in general use in modern telecommunications networks. Typically, control of ancillary telecommunications devices is achieved (and limited) by such signaling techniques.

Such signaling techniques are used to pass call control signals from one telecommunications network element to another to effect proper call routing and processing. Ancillary telecommunications devices take advantage of such signaling techniques to automatically activate/deactivate to service calls. Such signaling techniques are known as Channel Associated Signaling (CAS) and Common Channel Signaling (CCS).

In a CAS environment, call control is achieved through use of signaling bits within a call's data-payload to pass control signals between switching elements and to alert the presence of calls in a telecommunications network. For example, in channelized DS-1 applications, per-channel circuit signaling may be achieved by allowing every $6^{th}$ data frame and, in particular, the least significant bit thereof (i.e., the eight bit of each time slot) to be used or "robbed" for signaling purposes. Accordingly, CAS signaling has often been referred to as "robbed bit" signaling.

Such signaling bits also may be used to indicate the presence of an incoming call to an ancillary telecommunications device that exists in a particular call path. Ancillary devices such as echo cancellers, etc., monitor signaling bit status and activate/deactivate accordingly (e.g., turn themselves on or turn themselves off). Unfortunately, typical call setup processes and systems set the signaling bits at the beginning of a call (e.g., to affect ancillary devices, etc.) and leave those bits as set throughout the duration of the call. Currently, there is no way to control such signaling bits to effect intra-call control of an ancillary telecommunications device.

In a "superframe format" (SF) CAS environment as defined in ANSI Standards Document T1.107-1995, bits may be robbed for signaling from every $6^{th}$ and $12^{th}$ frames that make up a superframe (i.e., 12 frames) of channelized call data. In particular, the bit from the $6^{th}$ frame of a superframe is commonly referred to as the "A" bit, while the robbed bit from the $12^{th}$ frame of a superframe is commonly referred to as the "B" bit. In an extended superframe (ESF) arrangement where 24 frames consisting of 24 channels per frame are provided and processed, signaling bits may be robbed from every $6^{th}$, $12^{th}$, $18^{th}$ and $24^{th}$ frames which are respectively referred to as "A," "B," "C," and "D" signaling bits. Depending the nature of the signaling to be performed (e.g., switch control for routing or pre-/post-call control of ancillary telecommunications devices, etc.), each bit of the signaling channels derived by the aforementioned signaling bits may take on one of two states (i.e., ON or OFF). Accordingly, depending on the number of signaling bits provided in a CAS environment, for example, $2^n$ (where n is the number of signaling bits) signaling combinations (i.e., bit sequences) may be used for control purposes. Unfortunately, however, signaling bits take up valuable payload area in a CAS environment that could otherwise be used for transport of call content.

To address the use of payload bits for signaling as in the case of a CAS signaling environment, CCS signaling was developed and now is widely deployed. In a CCS environment (e.g., similar or like an SS7 network, etc.), signaling and call control for call setup are passed between network elements on a disassociated channel outside of a call's payload channels. Accordingly, a payload channel retains all payload bits without signaling schemes requiring robbed bits and the like.

Despite their flexibility, CAS and CCS signaling environments are not without their problems especially with regard to controlling ancillary telecommunication equipment. For example, in both CAS and CCS signaling environments, the way signaling bits may be used is limited. In particular, in a CAS environment, a signaling state exists for on-hook and off-hook conditions for a number of different signaling formats (e.g., Ear & Mouth signaling (E&M), etc.), thus requiring ancillary devices to be configured to monitor for a host of activate/deactivate conditions. Additionally, signaling states may only be changed at the onset or termination of a call connection. There can be no intra-call change of signaling states that may be used to control ancillary telecommunications devices.

And, since there are no "signaling bits" within a payload envelope in CCS signaling environment (since CCS uses a separate, disassociated network for signaling that frees bits that are otherwise used in CAS environment for signaling), ancillary equipment must rely on the detection of idle codes within a payload envelope to detect the onset of a next call event (e.g., on-hook, etc.). As such, the use of internal processes such as continuity tests (COT tests) on inter-machine trunks (IMTs) can cause ancillary devices like echo cancellers to false-trigger and begin operating prior to the onset of a call. And, like CAS signaling environments, call connection changes in a CCS signaling environment cannot be made during or once a call connection is established.

In addition to the CAS and CCS signaling paradigms discussed above, other signaling methods to extend call-by-call control of ancillary telecommunications equipment have been proposed. Although such methods have many merits, they also have limitations that ultimately preclude their use to effect control of ancillary telecommunications devices. Such other signaling methods include facility data link (FDL) signaling and external lead signaling. The use of FDL signaling requires a network that supports extended superframe line formatting. External lead based signaling utilizes an external control link from a switching platform to ancillary devices within a telecommunications network. Although external lead based signaling and control will allow needed ancillary device control, the same introduces many problems associated with cable and line management and database administration that would prove to be substantial in larger telecommunications networks.

Thus, there exists a need to provide systems and methods that will enhance signaling operations within CAS and CCS environments to effectively and efficiently control ancillary telecommunications equipment before, during, and after call establishment. Such systems and methods must operate within current signaling systems without requiring significant platform and infrastructure modifications. To be viable, such systems and methods must allow existing signaling techniques and systems to be redefined to support new and different signaling needs.

SUMMARY OF THE INVENTION

The present invention solves the problems associated with prior signaling systems to allow ancillary telecommunications devices to be controlled before, during, and after call set-up and other call processing operations. Such control is achieved in accordance with the present invention by affecting signaling bits in a channel associated signaling (CAS) environment, and payload data within a common channel signaling (CCS) environment. For example, in a CCS signaling environment ancillary telecommunications devices such as echo cancellers are normally set to be in an inactive or bypass (deactivated) state prior to call set-up. Upon receipt of a call that requires an echo canceller to be active (i.e., to counteract the effects of echo in a voice call, etc.), a switch sets outbound "signaling bits" high for a certain number (e.g., 12) of standard signaling frames (thus activating the echo canceller) and then reverts the data channel (s) containing the call to a clear channel mode (i.e., to a mode that allows complete usage of call data channels). In a CCS context, there are no signaling bits within a payload envelope; the present invention redefines payload bits (for relatively short periods of time) to facilitate intra-call control of ancillary telecommunications devices. An echo canceller in such a scenario converts to an active mode until signalled by signaling switch with another set of signaling frames having signaling bits set high. Intra-call control of an echo canceller, for example, is achieved by the present invention by affecting the signaling bits (e.g., via signal modulation, cancellation, etc.) in a prescribed way (based on operational parameters of a particular echo canceller) for a particular number of frames and/or for a particular amount of time. Accordingly, in a CCS environment data channels related to a call are affected only for a definite, relatively short period of time (e.g., for a certain number of frames) related to signaling to control one or more echo cancellers. Thus, ancillary device control during as well as before and after a call according to the present invention also will allow full channel bandwidth utilization for call payload processing.

In a CAS environment, in contrast to a CCS environment, signaling bits are in use during the course of the call connection (i.e., are part of a call's payload). However in an E&M (ear & mouth) signaling environment, for example, an "A" bit may be used to support the call connection thereby allowing a "B" bit to be modulated (during a call, for example) in accordance with the present invention to activate/deactivate an echo canceller as described above with regard to a CCS environment. The main drawback here is the limited bandwidth that the "B" bit represents (e.g. one bit may be set to either an ON state or an OFF state thus possibly requiring additional successive frames for signaling state changes, etc.). Accordingly, the present invention now allows CAS signaling environments to redefine the use of certain signaling bits within channelized data to effect control of ancillary telecommunications devices. Because control of such devices may be achieved by modulating or otherwise affecting payload data for only relatively short periods of time (e.g., for a certain number of data frames, etc.), little to no effect on communications, especially voice communications, will be realized. And, any such adverse effects that may be realized will be counterbalanced and, possibly, negated by the gains in control that result from intra-call control of ancillary telecommunications devices.

The present invention achieves the aforementioned functionality by providing systems and methods for controlling a telecommunications device such as an echo canceller within a telecommunications system. The systems and methods include and involve a switching system that is configured to receive a call from a calling station and to route said call within said telecommunications system and an ancillary telecommunications device that is configured to control a call processing parameter to affect said call. The switching system and the ancillary telecommunications device are coupled to each other via a channelized call data network. The channelized call data network is configured to communicate data corresponding to the call over at least one data channel. The ancillary telecommunications device controls the call processing parameter to affect the call based on a directive issued by the switching system to the ancillary telecommunications device during the call. The directive is contained within at least one channel of the channelized call data network. The channelized call data network may be completely used for call processing and call payload transport even after the ancillary telecommunications device operates as directed (e.g., activates, deactivates, etc.) during the call.

The above-summarized aspects of the present invention are described in detail below with regard to the attached drawing figures which are next discussed.

BRIEF DESCRIPTION OF THE DRAWINGS

The present invention is described in detail below with reference to the following drawing figures, of which.

DETAILED DESCRIPTION OF THE PREFERRED EMBODIMENTS

The present invention is now described in detail with reference to the drawing figures that were briefly discussed above. A system overview is followed by a discussion of corresponding operational aspects. Unless otherwise indicated, like parts, systems, and processes are referred to with like reference numerals.

SYSTEM OVERVIEW & STRUCTURAL ASPECTS OF THE PRESENT INVENTION

Figure 1:
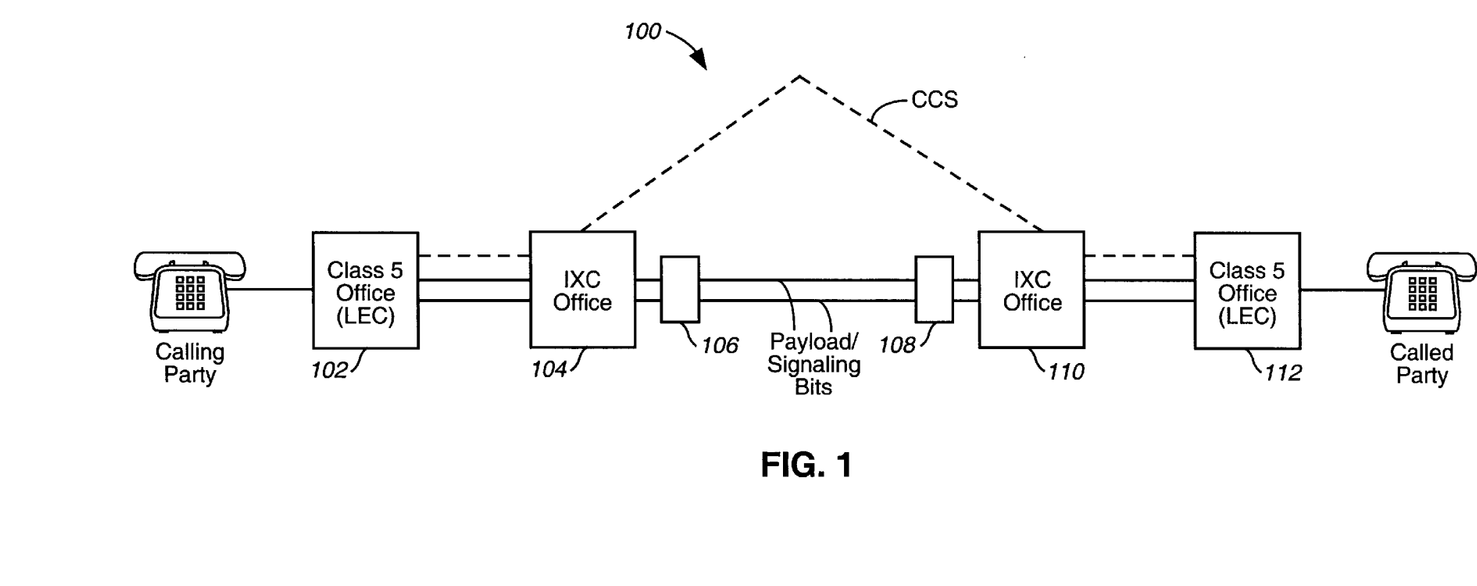
FIG. 1 is a diagram of a system in which call payload bits in a CCS signaling environment are redefined to allow ancillary telecommunications equipment to be controlled before, during, and after call processing according to a preferred embodiment of the present invention.
Figure 2:
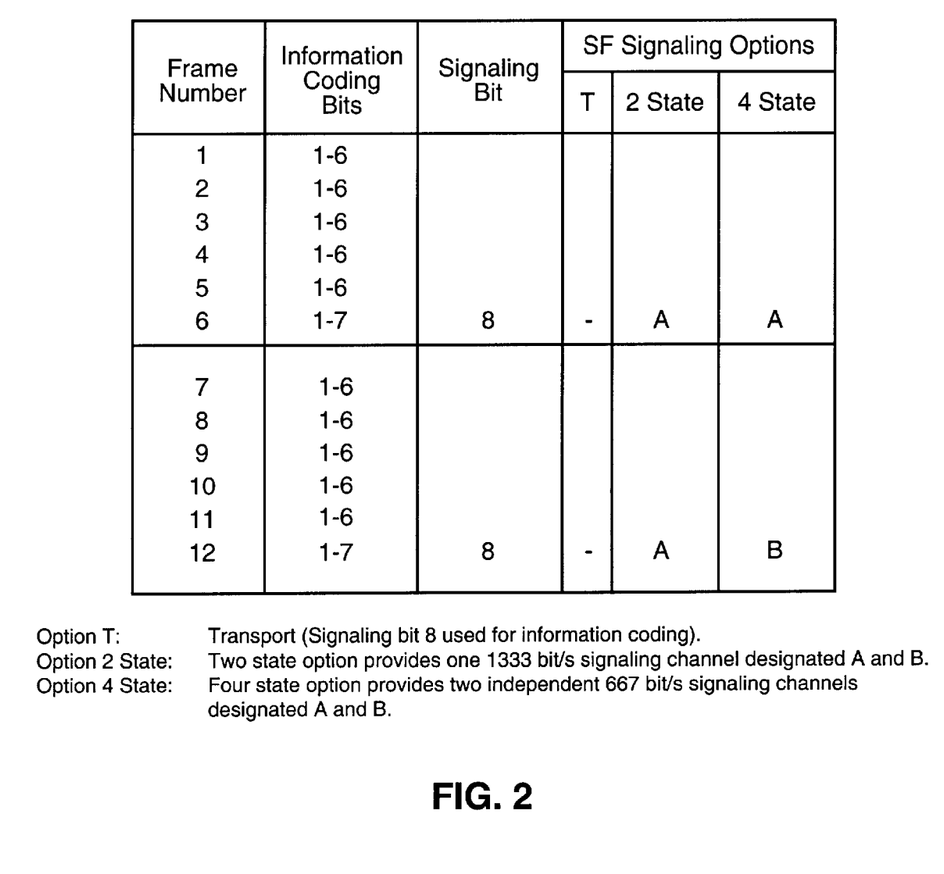
FIG. 2 is a table illustrating a superframe overhead structure processed within a robbed-bit signaling environment.

To illustrate the novel features and aspects of the present invention, reference is generally made to FIGS. 1 and 2. The structures shown in FIG. 1 are further described in the call processing scenarios illustrated in FIGS. 3 through 8 which are discussed in detail below.

Referring now to FIG. 1, depicted therein is a diagram of a system in which data transport in a common channel signaling (CCS) environment is redefined to allow ancillary telecommunications equipment to be controlled before, during, and after call processing according to a preferred embodiment of the present invention. In particular, system 100 includes telecommunications network that further includes a calling party located at a call initiation station, a class 5 office (local exchange carrier (LEC) central office) 102, an inter-exchange carrier (IXC) office 104, an ancillary telecommunications device 106 (e.g., an echo canceller used to inhibit echo conditions within voice communications over the telecommunications network in system 100), another ancillary communications device 108 (e.g., another echo canceller), an inter-exchange office (IXC) 110 (e.g., one operated by a long-distance telephone service provider), a class 5 office (local exchange carrier (LEC) central office), and a called party located at a call termination station. In system 100, the calling party and the called party are outfitted with telephone termination equipment to support both voice and data communications.

In the context of the present invention, calls are routed between the calling party and the called party among switching systems maintained and managed by IXC 104 and IXC 110. The content of a call from the calling party to the called party, for example, is digital in nature and is transported in a channelized data network on which switching systems like or similar to those maintained by IXCs 104 and 110 and are addressed as network elements. The solid lines coupling the network elements in system 100 are intended to identify the channelized data network over which call data is transported. The call processing and, in particular, the signaling necessary to transport and route a call from the calling party to the called party is carried over a disassociated channel and does not form part of the data making up the channelized call data (i.e., the call payload). Accordingly, the telecommunications network in system 100 is one that allows signaling according to a common channel signaling paradigm as indicated by the dashed network links in system 100. Such a system will be immediately understood by those skilled in the art.

Since signaling occurs within system 100 over a disassociated signaling channel as indicated by the dashed lines/ links in system 100, there would normally be no need to affect channel payload content transported over the channelized data network as indicated by the solid lines/data links in system 100 (i.e., no need to affect A, B, etc. signaling bits) as would normally occur in a CAS signaling environment. However, the present invention allows control of ancillary telecommunications devices like devices 106 and 108 during a call by, in fact, manipulating and otherwise "robbing" unused "signaling bits" within channelized call data. That is, in contrast to prior systems that only allowed pre-call and post-call control of an ancillary device (e.g., turning an echo canceller on or off, etc.), the present invention now allows such ancillary devices to be controlled (e.g., turned on, off, or otherwise set—e.g., the setting and control of device operating parameters, etc.) during (intra) a call in progress within system 100.

Signaling bits that may be affected to control ancillary telecommunications devices like devices 106 and 108 within system 100, are illustrated in FIG. 2. It is worth noting again that the present invention allows the use and redefinition of such "signaling bits" because actual call flow signaling in system 100 (FIG. 1) is achieved out-of-band by way of a payload-disassociated common signaling channel network (i.e., over the network indicated by the dashed lines/data links in system 100).

Accordingly, depicted in FIG. 2 is a table that illustrates a superframe structure that normally may be processed within a robbed-bit signaling environment such as within a CAS environment. In particular, if two bits are to be robbed and identified as A and B bits, the same may be found in the least significant bits of the $6^{th}$ and $12^{th}$ frames of a superframe-formatted frame structure. If such bits are not used for switch signaling, for example, (as in a CCS environment that incorporates the present invention), the same may be redefined (in the payload of a call) to control ancillary equipment. In such a case, although there will be a data loss attributed to redefining such least significant bits, such redefinition will have little to no impact on overall data communications during a particular call (especially since ancillary device control signals resulting from bit control need only be affected for limited periods of time—e.g., set high, low, etc. for 12 successive frames, etc.). Alternatively, if the present invention is incorporated into a CAS environment, such bits (or only a certain number of bits—e.g., one bit) may be manipulated (e.g., modulated for particular periods of time, etc.) to allow for additional control of ancillary telecommunications devices.

Thus, the above described structures address problems associated with modifying and controlling ancillary telecommunications devices such as echo cancellers, etc. Such problems are addressed by the present invention during call connection by redefining the use of signaling bits in CAS environments and payload bits in CCS environments.

This present invention supports implementation of call-by-call control of ancillary telecommunications equipment in order to address the problems associated with:

echo canceller activation and deactivation control echo cancellers equipped with AT&T True Voice ("AT&T" and "True Voice" are trademarks and/or registered trademarks of AT&T CORPORATION.)

allocation of bandwidth associated with DCME types of equipment support for ISDN type digital data calls switched 56/64 data calls and Nx56/64 data calls The central idea on which the present invention relies is the reuse/redefinition of current payload bits that have been assigned for signaling in a CAS-type environment, and those that have been freed-up in a CCS-type environment.

By modulating such bits during a timed on-off interval, or via a unique modulation format (e.g., modulation of signals for particular periods of time in particular ways, etc.), ancillary devices can be controlled prior to, during, and after call set-up has been established. The particular modulation of bit signals to effect control of such ancillary devices will depend on the nature and operating parameters of the ancillary devices that are to be controlled. Moreover, the modulation of signals to effect digital bit sequences and/or other control signals will be immediately understood by those skilled in the art.

An exemplary use of the present invention in a CCS signaling mode is as follows: All echo cancellers in a telecommunications system are in an inactive or bypass (deactivated) state. Upon receipt of a call that requires an echo canceller to be active (i.e., to counteract the effects of echo in a voice call, etc.), a switch sends the signaling bits in a call's payload high for 12 standard signaling frames (thus activating the echo canceller) and then reverts the data channel(s) containing the call to a clear channel mode (i.e., to a mode that allows complete usage of the call data channels—e.g., for 64 Kb/s data transfers, etc.). The echo canceller in such a scenario converts to an active mode until signaled by the signaling switch with another 12 signaling frames having signaling bits set high. As such, intra-call control of the echo-canceller is achieved by affecting the signaling bits (e.g., via signal modulation, cancellation, etc.) in a prescribed way (based on operational parameters of a particular echo canceller) for a particular number of frames and/or for a particular amount of time.

In a CAS mode, in contrast to a CCS mode, signaling bits are in use during the course of the call connection (i.e., are part of a call payload). However in an E&M (Ear & Mouth) signaling environment, for example, the A bit could support the call connection, thus allowing the B bit to be modulated in a way which activates or deactivates an echo canceller as described above with regard to a CCS environment. The main drawback here is the limited bandwidth that the B bit represents (e.g. one bit may be set to either an ON state or an OFF state thus possibly requiring additional successive frames for signaling state changes, etc.). The signaling carried out by network elements such as switches coupled to echo cancellers, for example, need be programmed and configured and based on ancillary device parameters to effect control and signaling relative to already used signaling bits ("A", "B", etc.) or other payload envelope bits, such programming and configuration will be readily understood by those skilled in the art.

In a further extension of the present invention, an ancillary devices may respond back to a signaling switch as a way of receipting the instruction to activate/deactivate, for example. In this manner a switching network could signal to other nodes in the network a need for or the prior application of the appropriate ancillary equipment. Such additionally functionality may prove quite advantageous in device fault correction situations.

OPERATIONAL ASPECTS OF THE PRESENT INVENTION

The structures described above are configured to operate together to allow ancillary telecommunications devices such as echo cancellers to be controlled during a call within a telecommunications system. The structural aspects of the present invention necessary to achieve such results were addressed and described above. The corresponding operational aspects of the present invention are next described with reference to the diagrams and flowcharts found in FIGS. 3, 4A, 4B, 4C, and 5–8 to which references is now made. Such drawing figures illustrate the operations of the present invention by illustrating call processing scenarios that will be recognizable and explanatory to those skilled in the art. The applicability of the present invention and, in particular, the control of "signaling bits" to achieve intra-call control of ancillary telecommunications devices as provided by the present invention will be immediately understood by those skilled in the art after reviewing the discussions that follow.

In the systems illustrated in FIGS. 3, 4A, 4B, 4C, and 5–8, it is to be understood that such systems may operate as either CAS or CCS signaling environments. In the case of CAS signaling, modulation of signaling bits according to the present invention and, in addition to conventional bit robbing techniques, will allow ancillary telecommunications devices like echo cancellers to be controlled. In the case of CCS signaling, bits that would be used as CAS-type signaling bits within a call payload envelope (or other bits in other frame positions, etc.) may be controlled (e.g., modulated, etc.) to effect intra-call control (and pre- and post-call control) of ancillary telecommunications devices.

In the paragraphs that follow, the term "point" is used to refer to particular points within a processing sequence related to a telephone call. Such points are illustrated in drawing FIGS. 3–8 by numbers within parenthesis.

Figure 3:
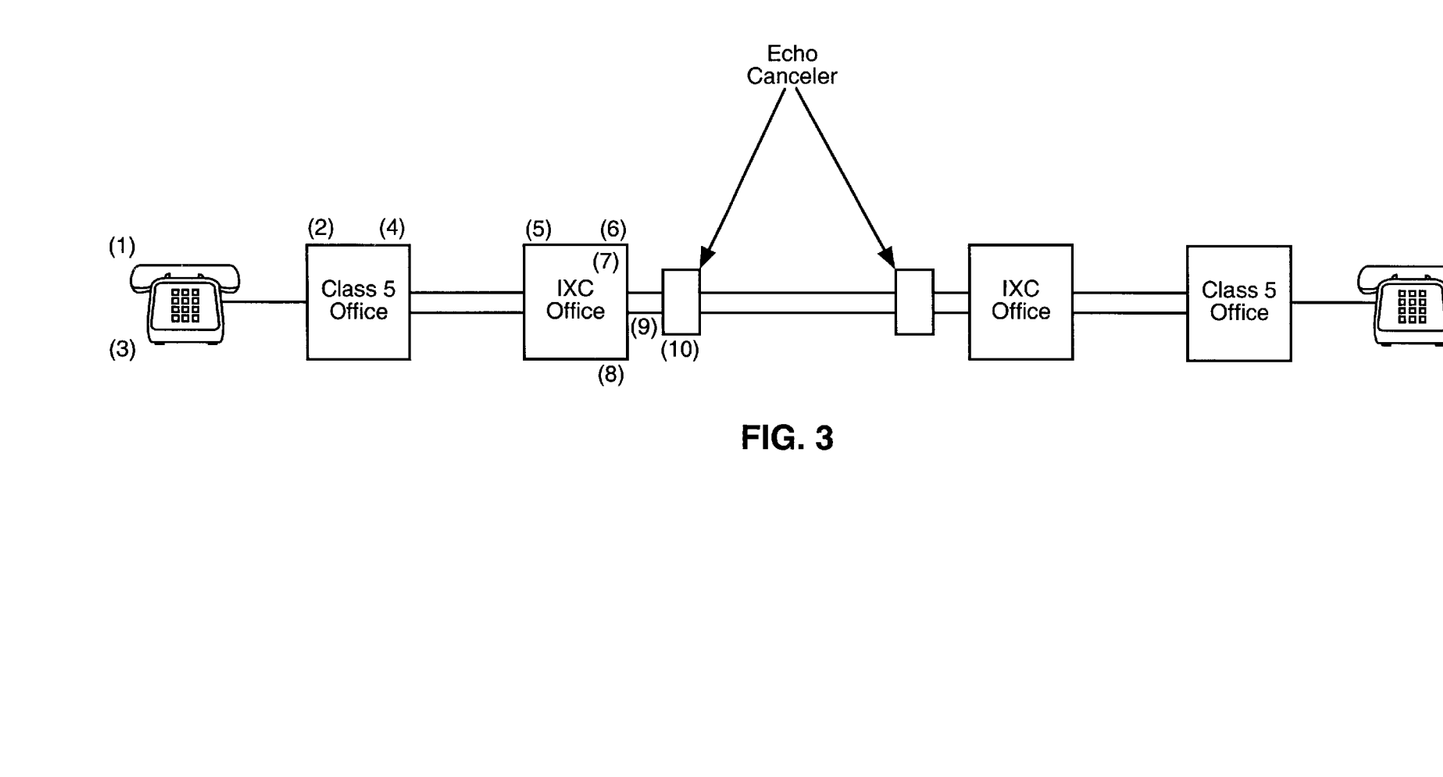
FIG. 3 is a block diagram that illustrates a first call processing scenario according to a preferred embodiment of the present invention.

Referring now to FIG. 3, depicted therein is a block diagram that illustrates a first call-processing scenario according to a preferred embodiment of the present invention. In particular, a calling party goes off hook towards a local class 5 office at point 1. At point 2, a class 5 office responds with a dial tone which is supplied to the calling party at his telephone terminal device. At point 3, a calling party will dial the number for the termination location corresponding to the called party. At point 4, the class 5 switch forwards the dialed information to IXC switch under normal call flow. At point 5, the IXC switch interprets the call request for call routing accordingly. At point 6, the IXC switch selects an outbound termination trunk for forwarding the call.

At point 7, the IXC switch performs continuity (COT) test. The COT test is transmitted in the direction of the called party. At point 8, the IXC switch receives an acknowledgement of the COT test from the distant-end switch at the distant-end IXC office. Accordingly, at point 9, the IXC switch modulates the signaling bits towards the distant-end switch. An ancillary telecommunications device such as an echo canceller detects and reads the modulated signal and activates or deactivates echo control accordingly and, possibly, during the telephone call.

In such a scenario, the call implementation is unchanged except for the fact that the echo canceller was activated/deactivated in response to a directive issued by the switching platform. This is different from normal call scenarios where the echo cancellers respond as an incidental act resulting from switching platforms signaling each other as in a CAS environment. In a CCS environment, activation of an echo canceller conveniently is a response to a change in the payload pattern that could be either an incidental result of a call connection (i.e. of a COT test), or as an actual change in payload due to user speech or data activity.

Figure 4A:
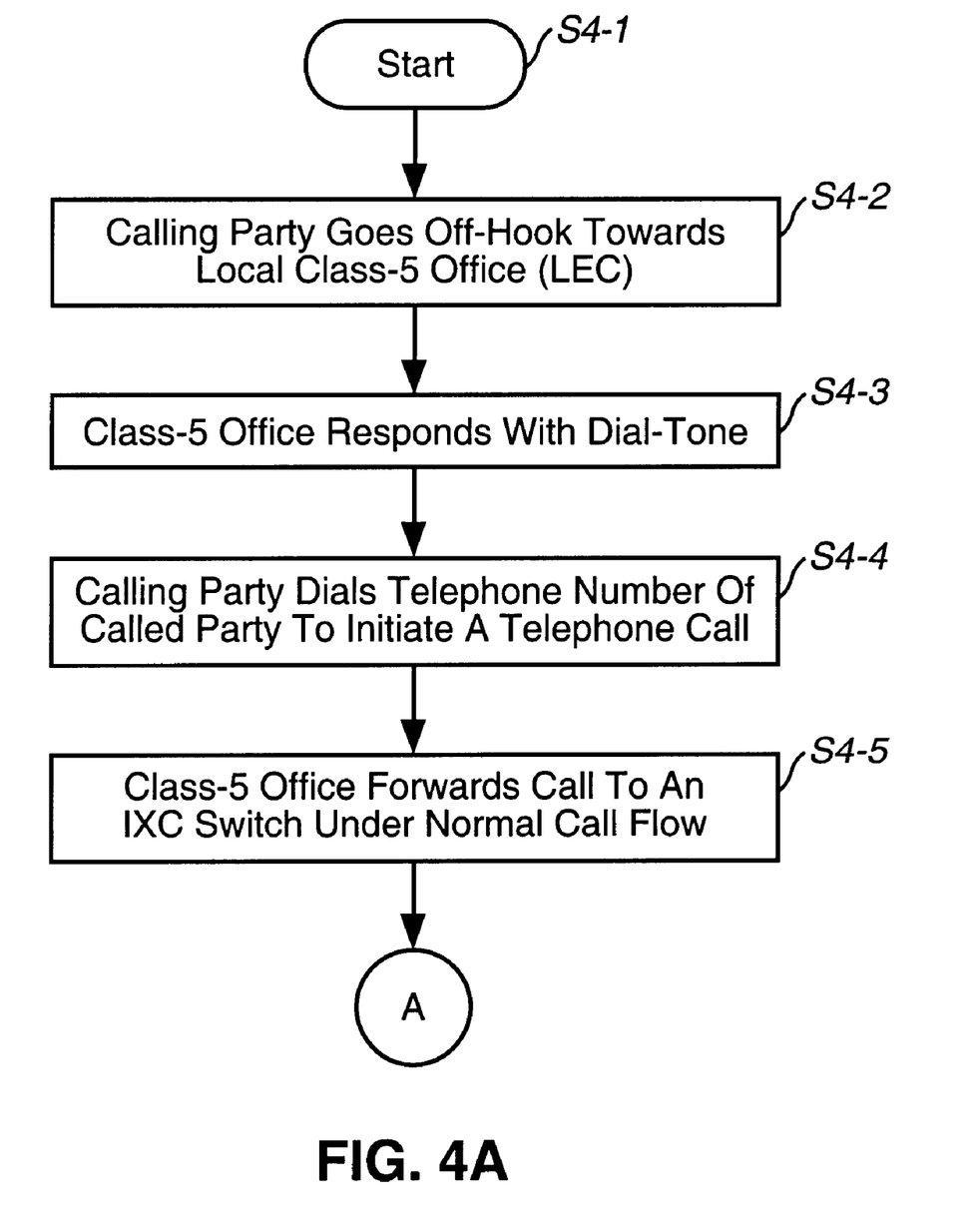
FIG. 4A is a flowchart of the process carried out within the system depicted in FIG. 3 to effect intra-call control of ancillary telecommunications devices like echo cancellers, etc.
Figure 4B:
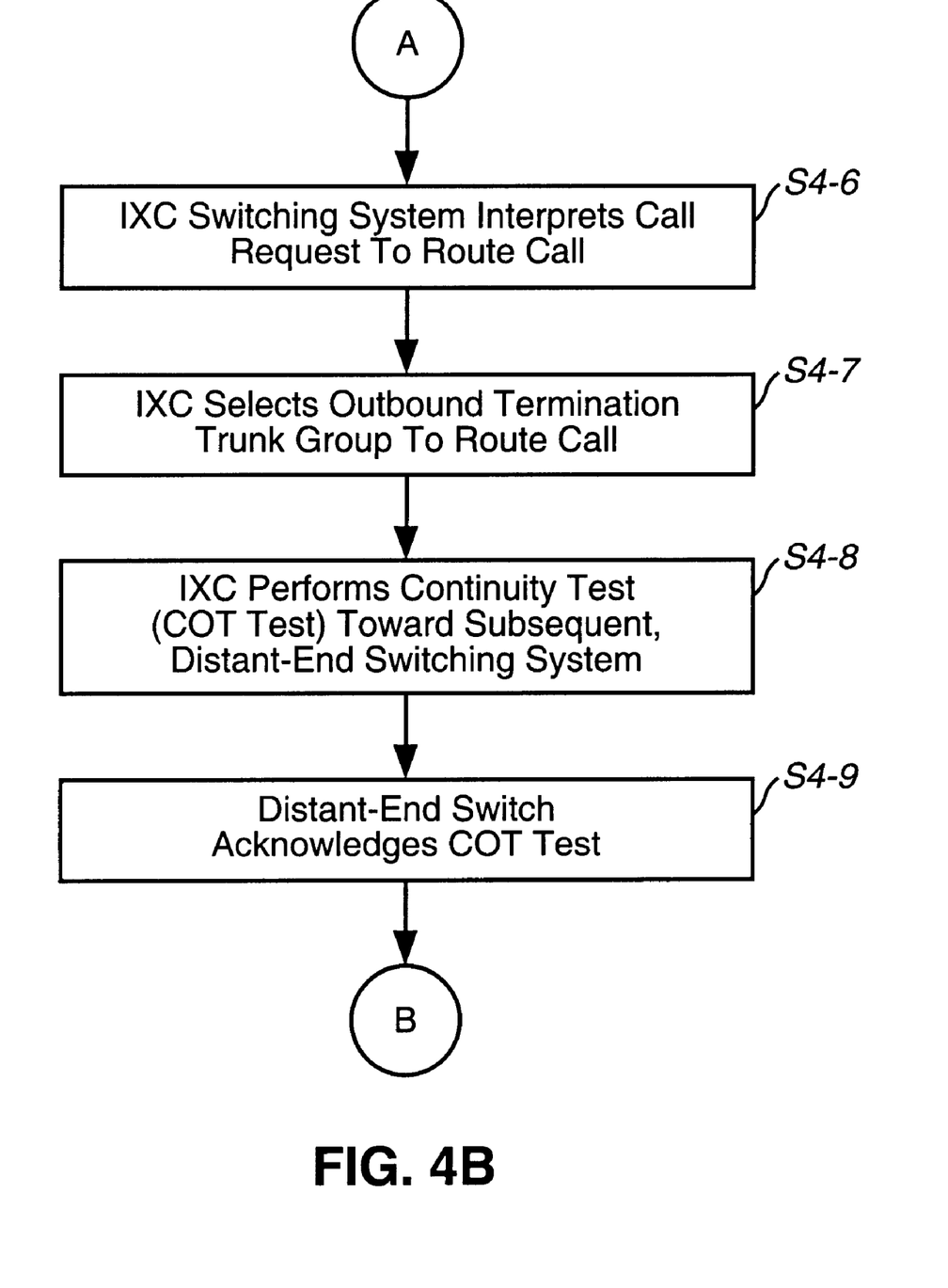
FIG. 4B is a continuation flowchart of the flowchart started in FIG. 4A.
Figure 4C:
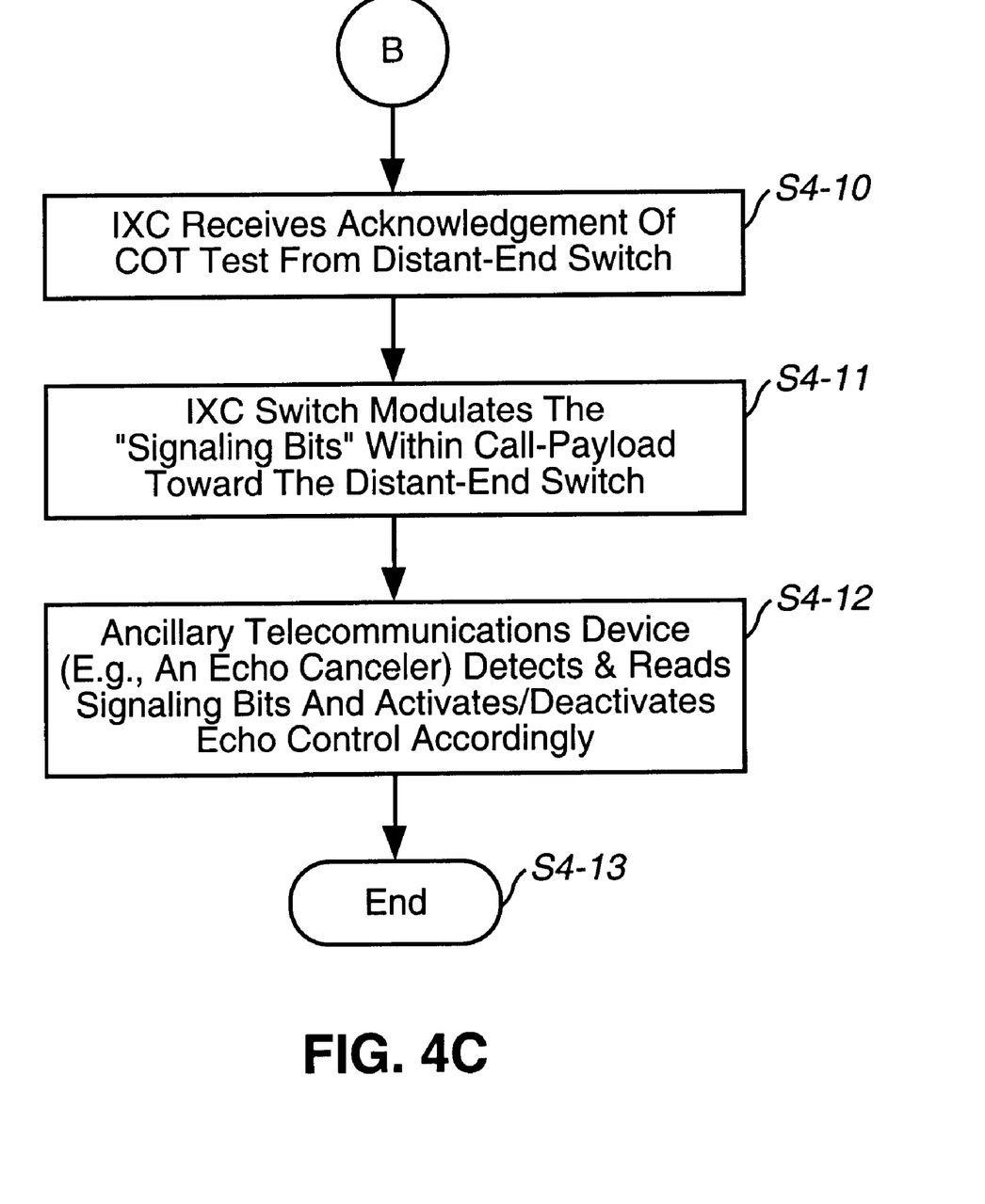
FIG. 4C is the conclusion flowchart of the flowchart started in FIGS. 4A and 4B.

To further illustrate the processes carried out within the system depicted in FIG. 3, and to illustrate the processes that may be carried out in the systems depicted in FIGS. 5–8, generally, reference is now made to FIGS. 4A, 4B, and 4C. In particular, depicted in FIGS. 4A, 4B and 4C, is a flowchart that illustrates the operations carried out within the system depicted in FIG. 3 to provide intra-call control of ancillary telecommunications equipment according to preferred to embodiment of the present invention.

Processing starts at Step S4-1 and immediately proceeds to S4-2. At step S4-2, a calling party goes off hook towards a local class-5 office (e.g., a LEC office). Next, at Step S4-3, the class 5 office responds with a dial tone and provides the same to the calling party. Next, at step S4-4, the calling party dials a telephone number of the called party to initiate a telephone call accordingly (e.g., a voice call).

Next, at Step S4-5, the class-5 office forwards the call (request) to an IXC switch under normal call flow.

Processing continues at the top of FIG. 4B.

At Step S4-6, the IXC switch interprets the call request to route the call accordingly. Next, at step S4-7, the IXC switch selects an outbound termination trunk. Thereafter, at Step S4-8, the IXC switch performs a continuity test (COT Test) toward a subsequent, distant-end switch maintained at a subsequent IXC office to determine, among other things the need and or applicability of echo control. Next, at Step S4-9, a distant-end switch acknowledges the COT test and processing proceeds at the top of FIG. 4C.

At Step S4-10, the IXC switch receives acknowledgement of the COT test from the distant-end switch. Next, at Step S4-11, the IXC switch modulates the "signaling bits" or other payload bits toward the distant-end switch. Thereafter, at Step S4-12, an ancillary device (e.g., an echo canceller, etc.) detects and reads the signal bits and activates/deactivates accordingly (e.g., activates/deactivates echo-control).

Processing ends at Step S4-13.

Figure 5:
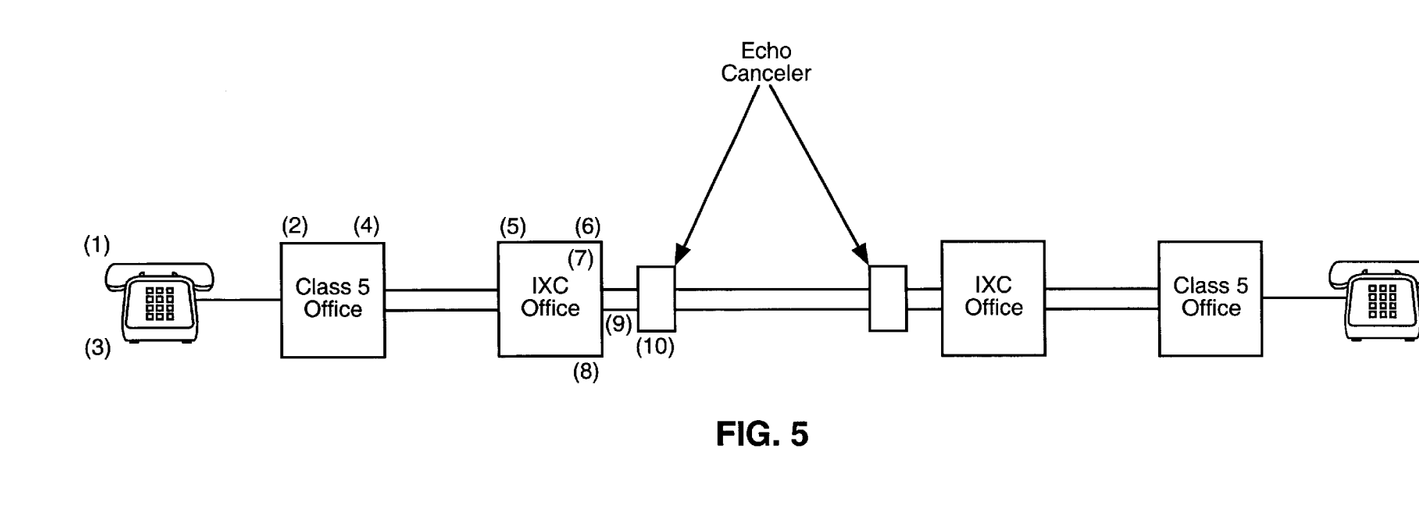
FIG. 5 is a block diagram that illustrates a second call processing scenario according to another preferred embodiment of the present invention.

Referring now to FIG. 5, depicted therein is a block diagram that illustrates a second call processing scenario according to another preferred embodiment of the present invention. In particular, in the call scenario depicted in FIG. 5, a calling party is placing a digital data call. In this case, an ancillary device such as an echo canceller is to be left inactive (or place in an inactive state). Accordingly, at point 1, the calling party goes off hook towards the local class-5 office. At point 2, the class-5 office responds with a dial tone appropriately. At point 3, the calling party dials the telephone number for the termination location corresponding to the called party. At point 4, the class-5 switch forwards the call request information to an IXC switch under normal call flow. At point 5, the IXC switch interprets the call request for call routing accordingly. At point 6, the IXC switch selects an outbound termination trunk for further call routing. At point 7, the IXC switch performs a COT test. At point 8, the IXC switch receives an acknowledgement of the COT test from a distant end switch. At point 9, the IXC switch completes the call without modulating the signaling bits toward the distant end switch. And, at point 10 the ancillary device (e.g., an echo canceller) does not receive a modulation to act upon and remains in an idle or bypass state.

Accordingly in the call scenario depicted in FIG. 5, an echo canceller is deliberately left in an idle or inactive state as specified during flow. In a normal CAS environment, this would not be allowed. Once the signaling bits are raised, the echo canceller becomes active. In a CCS environment, on the other hand, once the channel idle code has been interrupted, the echo canceller also becomes active regardless of the call connection requirements.

Figure 6:
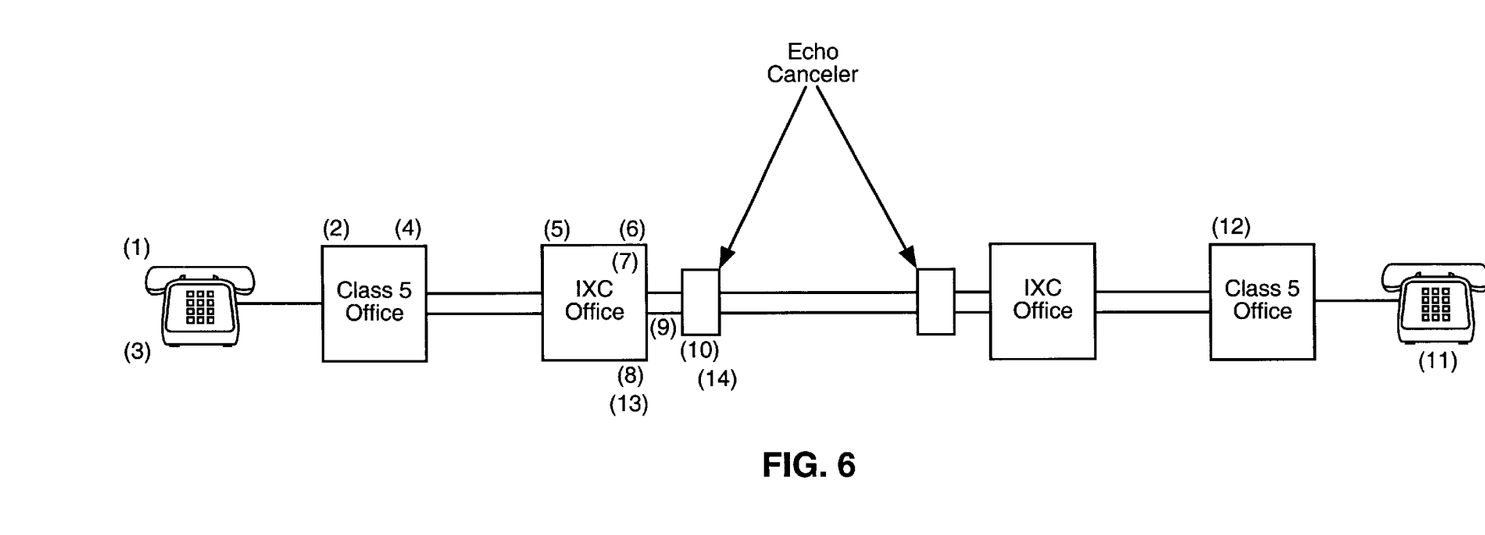
FIG. 6 is a block diagram that illustrates a third call processing scenario according to another preferred embodiment of the present invention.

Referring now to FIG. 6 depicted therein is a block diagram that illustrates a third call processing scenario according to another preferred embodiment of the present invention. In the call scenario depicted in FIG. 6, the calling party places a digital data call but the network or end termination could not support the call type and the call is forced to revert to a voice band data connection. In such a scenario, echo-control is required to complete the call, however an echo canceller was never activated. In such a call scenario, the echo canceller could be set according to the present invention, thereby allowing the call to properly complete.

Accordingly, at point 1, the calling party goes off hook towards local class 5 office. At point 2, the local class 5 office responds with a dial tone. At point 3, the calling party dials the telephone number for the called party at a termination location. At point 5, the class 5 switch forwards the call request information to an IXC switch under normal call flow. At point 5, the IXC switch interprets the call request to route the call appropriately. At point 6, the IXC switch selects an outbound termination trunk for call routing. At point 7, the IXC switch performs a COT test. At point 8, the IXC switch receives an acknowledgement of the COT test from the distant end switch. At point 9, the IXC switch completes the call without modulating the signaling bits toward the distant switch.

At point 10, an echo canceller does not receive a modulation to act upon and remains in an idle or bypass state. At point 11, the distant end termination cannot complete the call as requested. Instead the distant end has to provide for a voice-band termination. Accordingly, at point 12, the distant-end switch signals such an error condition back to the initiating IXC switch. As such, at point 13 the IXC switch responds by modulating the signaling bits back to the distant-end switch during the call. And, at point 14, the echo canceller senses the modulation and responds by activating the echo canceller to allow call completion appropriately.

Figure 7:
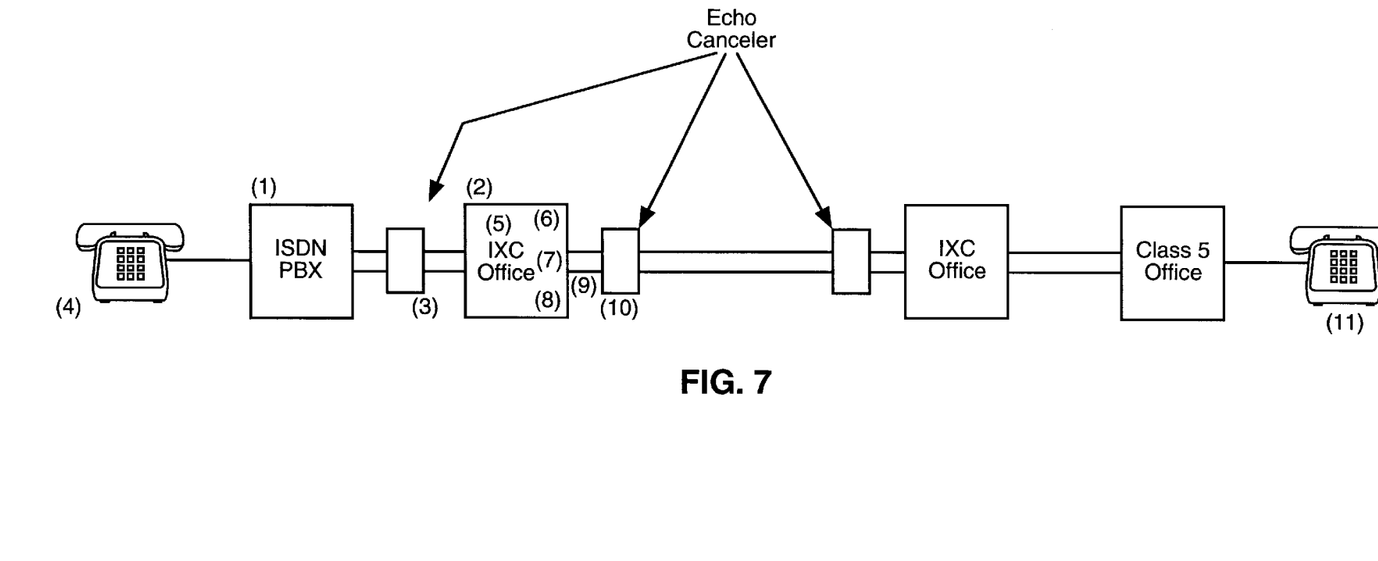
FIG. 7 is a block diagram that illustrates a fourth call processing scenario according to another preferred embodiment of the present invention.

Referring now to FIG. 7, depicted therein is a block diagram that illustrates a fourth call processing scenario according to another preferred embodiment of the present invention. In particular, in the call scenario illustrated in FIG. 7, an echo canceller is on an access or customer circuit. Accordingly, the customer circuit is an ISDN primary rate interface (PRI) configured as 23 barer and one data channel (23 B+D). The problem with ISDN access trunks is that the length must be limited in order to accommodate possible echo conditions when interconnecting into the publicly switched telephone network (PSTN). Difficulties with echo control are further complicated and compounded when a customer is using ISDN digital data features that allow the transmission of digital data calls at rates from 56/64 Kb/s to Nx56/64 Kb/s. An echo canceller for example, in such a situation would likely corrupt such data calls as an echo canceller cannot distinguish such calls from standard voice transmissions.

Accordingly in FIG. 7, and, more particularly, at point 1 an ISDN calling party goes off hook towards an IXC office, thereby signaling on a D channel the type of call connection being required. At point 2, the IXC office responds with the appropriate D channel message. At point 3, the IXC switch recognizes the call as a data connection and does not modulate the signaling bits towards the echo canceller. The echo canceller remains disabled on the appropriate barer channels. At point 4, the calling party dials the telephone number for the called party. At point 5, the IXC switch interprets the calling party's call request and routes the call accordingly. At point 6, the IXC switch selects an outbound termination trunk.

At point 7, the IXC switch performs a COT test. At point 8, the IXC switch receives acknowledgement of the COT test from a distant-end switch. At point 9, the IXC switch does not modulate the signaling bits towards the distant-end switch.

At point 10, an echo canceller does not receive a signaling bit modulation to act upon and remains in an idle or bypass state. And, at point 11, the distant-end termination switch completes the call as requested.

Figure 8:
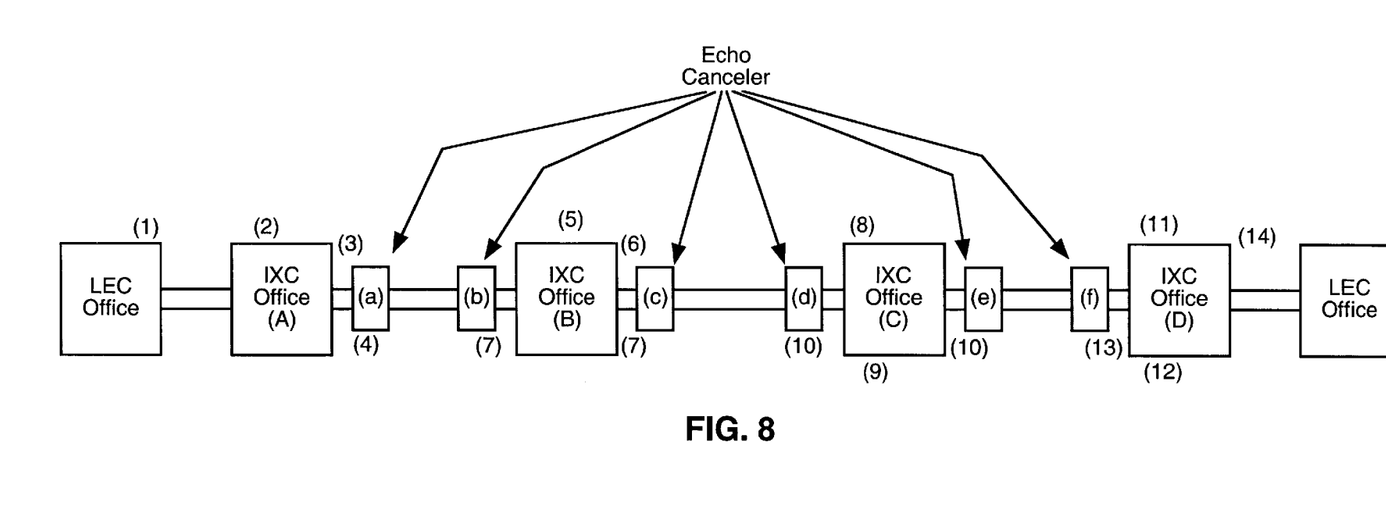
FIG. 8 is a block diagram that illustrates a fifth call processing scenario according to another preferred embodiment of the present invention.

Referring now to FIG. 8, depicted therein is a block diagram that illustrates a fifth call processing scenario according to another preferred embodiment of the present invention. In the call scenario depicted in FIG. 8, a system includes multiple echo cancellers in a call path. Accordingly, in such a scenario, the central echo cancellers identified as (b, c, d, e) do not need to be active in the call path to effectively and appropriately route and process the call.

For example, at point 1, a call enters an IXC network from a local exchange carrier. At point 2, IXC switch A receives the incoming call. At point 3, IXC switch A selects an outbound trunk group to establish a call connection. At point 4, IXC switch A sets an echo canceller to an active state. At point 5, IXC switch B receives the incoming call from IXC switch A. At point 6, IXC switch B selects an outbound trunk to complete the call connection. At point 7, IXC switch B sets echo cancellers b & c to an inactive state.

At point 8, IXC switch C receives an incoming call from IXC switch B. At point 9, IXC switch C selects an outbound trunk. At point 10, IXC switch C sets echo cancellers d & e to be inactive. At point 11, IXC switch D receives an incoming call from IXC switch C. At point 12, IXC switch D selects an outbound trunk. At point 13, IXC switch sets echo canceller f to an active state. And, at point 14 the call is completed to a downstream LEC switch.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A system for controlling a telecommunications device within a call processing environment, comprising:
    a first switching system configured to receive a call from a calling station and to route said call within said call processing environment;
    an ancillary telecommunications device configured to control a call processing parameter related to said call;
    a second switching system configured to route said call within said call processing environment toward a call termination station;
    said first switching system, said second switching system and said ancillary telecommunications device being coupled to each other via a channelized call data network, said channelized call data network configured to communicate a payload portion of said call over at least one channel in frames, at least some of said frames for said at least one channel bearing the payload portion comprising a signaling bit and at least one information coding bit; and
    said first switching system and said second switching system being coupled to each other via a dedicated signaling network,
    said dedicated signaling network configured to allow said first switching system and said second switching system to communicate control messages to each other,
    said control messages related to the routing and processing of said call,
    whereby said ancillary telecommunications device controls said call processing parameter to affect said call based on a directive issued by said first switching system to said ancillary device,
    said directive contained within the signaling bit of said at least some of said frames.

2. The system according to claim 1, wherein said ancillary telecommunications device is an echo canceller.

3. The system according to claim 1, wherein said directive includes a plurality of modulated signals generated based on corresponding operating parameters associated with said ancillary telecommunications device.

4. The system according to claim 3, wherein said modulated signals make up a digital bit sequence corresponding to said operating parameters.

5. The system according to claim 1, wherein said channelized data network is a frame-based digital telecommunications network, and said directive includes modulated bits of particular channels within corresponding frames of data corresponding to said call.

6. The system according to claim 1, wherein said call processing parameter is an echo cancellation parameter related to said call.

7. The system according to claim 1, wherein said directive controls said ancillary telecommunications device to affect said call before said call is routed within said call processing environment.

8. The system according to claim 1, wherein said directive controls said ancillary telecommunications device to affect said call during said call.

9. The system according to claim 1, wherein said directive controls said ancillary telecommunications device to affect said call after said call is routed within said call processing environment.

10. The system according to claim 1, wherein the channelized data network includes a Common Channel Signaling (CCS) network.

11. A system for controlling a telecommunications device within a call processing environment, comprising:
    a first switching system configured to receive a call from a calling station and to route said call within said call processing environment;
    an ancillary telecommunications device configured to control a call processing parameter to affect said call;
    a second switching system configured to route said call within said call processing environment toward a call termination station;
    said first switching system, said second switching system and said ancillary telecommunications device being coupled to each other via a channelized call data network,
    said channelized call data network configured to communicate a payload portion of said call over at least one channel in frames, at least some of said frames for said at least one channel bearing the payload portion comprising a signaling bit and at least one information coding bit,
    whereby said ancillary telecommunications device controls said call processing parameter to affect said call based on a directive issued by said first switching system to said ancillary device,
    said directive contained within the signaling bit of said at least some of said frames.

12. The system according to claim 11, wherein said ancillary telecommunications device is an echo canceller.

13. The system according to claim 11, wherein said directive includes a plurality of modulated signals generated based on corresponding operating parameters associated with said ancillary telecommunications device.

14. The system according to claim 13, wherein said modulated signals make up a digital bit sequence corresponding to said operating parameters.

15. The system according to claim 11, wherein said channelized data network is a frame-based digital telecommunications network, and said directive includes modulated bits of particular channels within corresponding frames of data corresponding to said call.

16. The system according to claim 11, wherein said call process ing parameter is an echo cancellation parameter related to said call.

17. The system according to claim 11, wherein said directive controls said ancillary telecommunications device to affect said call before said call is routed within said call processing environment.

18. The system according to claim 11, wherein said directive controls said ancillary telecommunications device to affect said call during said call.

19. The system according to claim 11, wherein said directive controls said ancillary telecommunications device to affect said call after said call is routed within said call processing environment.

20. The system according to claim 11, wherein the channelized data network includes a Channel Associated Signaling (CAS) network.

21. A method for controlling a telecommunications device within a call processing environment during a call, comprising the steps of:

receiving a call at a switching system within said call processing environment;

determining from said call whether a call processing parameter need be controlled to process said call;

causing an ancillary telecommunications device coupled to said switching system via a channelized call data network to control said call processing parameter during said call, said channelized call data network configured to communicate a payload portion of said call over at least one channel in frames, at least some of said frames for said at least one channel bearing the payload portion comprising a signaling bit and at least one information coding bit, said ancillary telecommunications device controlling said call processing parameter to affect said call based on a directive issued by said switching system to said ancillary telecommunications device during said call, said directive contained within the signaling bit of said at least some of said frames.

22. The method according to claim 21, wherein said channelized call data network transports calls within channels of frames of channelized data, said directive spanning a specified number of frames containing data related to said call.

23. The method according to claim 21, wherein said ancillary telecommunications device is an echo canceller and said call processing parameter is an echo cancellation parameter controllable by said echo canceller.

24. The method according to claim 21, wherein said directive includes digital signals transported in said at least one channel of said channelized call data network.

25. The method according to claim 24, wherein said digital signals are data signals that are modulated for a particular period of time.

26. The method according to claim 21, wherein said directive causes said ancillary telecommunications device to be placed in an active state.

27. The method according to claim 21, wherein said directive causes said ancillary telecommunications device to be placed in an inactive state.

28. The method according to claim 21, wherein said channelized call data network is usable for said call after said ancillary telecommunications device controlled said call processing parameter during said call.

29. The method according to claim 21, wherein the channelized data network includes a Common Channel Signaling (CCS) network.

30. The method according to claim 21, wherein the channelized data network includes a Channel Associated Signaling (CAS) network.

31. A system for controlling a telecommunications device within a call processing environment, comprising:

a switching system configured to receive a call from a calling station and to route said call within said call processing environment;

an ancillary telecommunications device configured to control a call processing parameter to affect said call;

said switching system and said ancillary telecommunications device being coupled to each other via a channelized call data network, said channelized call data network configured to communicate a payload portion of said call over at least one channel in frames, at least some of said frames for said at least one channel bearing the payload portion comprising a signaling bit and at least one information coding bit, whereby said ancillary telecommunications device controls said call processing parameter to affect said call based on a directive issued by said switching system to said ancillary telecommunications device during said call, said directive contained within the signaling bit of said at least some of said frames.

32. The system according to claim 1, wherein said ancillary telecommunications device is an echo canceller.

33. The system according to claim 1, wherein said directive includes a plurality of modulated signals generated based on corresponding operating parameters related to said ancillary telecommunications device.

34. The system according to claim 33, wherein said modulated signals make up a digital bit sequence corresponding to said operating parameters.

35. The system according to claim 31, wherein said channelized call data network is a frame-based digital telecommunications network and said directive includes modulated bits within corresponding frames of data corresponding to said call.

36. The system according to claim 31, wherein said call processing parameter is an echo cancellation parameter related to said call.

37. The system according to claim 31, wherein said ancillary telecommunications device indicates a status condition to said switching system by issuing a corresponding response within said at least one channel of said channelized call data network.

38. The system according to claim 31, wherein the channelized data network includes a Common Channel Signaling (CCS) network.

39. The system according to claim 31, wherein the channelized data network includes a Channel Associated Signaling (CAS) network.

* * * * *